(12) United States Patent
Chen et al.

(10) Patent No.: US 7,631,042 B2
(45) Date of Patent: Dec. 8, 2009

(54) METHOD TO UPDATE STATUS ON MULTIPLE VOICE AND TEXT SYSTEMS FROM A SINGLE DEVICE

(75) Inventors: Yen-Fu Chen, Austin, TX (US); John Hans Handy-Bosma, Cedar Park, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1056 days.

(21) Appl. No.: 10/880,728

(22) Filed: Jun. 30, 2004

(65) Prior Publication Data

US 2006/0031470 A1  Feb. 9, 2006

(51) Int. Cl.
*G06F 15/16* (2006.01)

(52) U.S. Cl. .................. 709/206; 709/204; 715/200

(58) Field of Classification Search .................. 709/206
See application file for complete search history.

(56) References Cited

U.S. PATENT DOCUMENTS

| | | | |
|---|---|---|---|
| 5,511,112 A | 4/1996 | Szlam | |
| 6,160,796 A | 12/2000 | Zou | 370/257 |
| 6,388,579 B1 | 5/2002 | Adcox et al. | 340/902 |
| 6,466,549 B1 | 10/2002 | Hattig | 370/254 |
| 6,529,951 B1 | 3/2003 | Okuyama et al. | 709/223 |
| 6,668,173 B2 | 12/2003 | Greene | 455/445 |
| 7,295,660 B1 * | 11/2007 | Higginbotham et al. | 379/196 |
| 2001/0054072 A1 | 12/2001 | Discolo et al. | |
| 2003/0156700 A1 | 8/2003 | Brown et al. | |
| 2004/0018831 A1 * | 1/2004 | Majmundar et al. | 455/419 |
| 2004/0039779 A1 | 2/2004 | Amstrong et al. | |
| 2004/0148356 A1 * | 7/2004 | Bishop et al. | 709/206 |

* cited by examiner

*Primary Examiner*—Moustafa M Meky
*Assistant Examiner*—O. C. Vostal
(74) *Attorney, Agent, or Firm*—Yee & Associates, P.C.; William H. Steinberg; Rudolf O. Siegesmund (57) ABSTRACT

A method for updating a message on a plurality of devices from a single device comprising a Configuration Program (CP), an Audio Device Update Program (ADUP), and a Text Device Update Program (TDUP). Using the CP, the user may enable and disable the present invention, add or delete devices, create and save messages, select existing messages to play to callers or display to senders, enable automated status updates, enable multiple message levels, or enable availability updates. The automated status update automatically creates messages from the user's calendar. The multiple message levels are a hierarchy of messages in which the message sent to a caller or sender based on their identity. The availability update communicates the user's next available time to the caller or sender. The ADUP and TDUP select the appropriate message to play or send based on whether automated status updates, multiple message levels, and availability updates are enabled.

3 Claims, 4 Drawing Sheets

| ID | VOICE MESSAGE | DATA MESSAGE | INTENDED RECIPIENT | EVENT |
|---|---|---|---|---|
| 124367 | v_message1.wav | d_message1.txt | ALL | ANY |
| 124368 | v_message2.wav | d_message2.txt | COMPANY EMPLOYEE | MEETING |
| 124369 | v_message3.wav | d_message3.txt | COMPANY EMPLOYEE | NOT MEETING |
| 124370 | v_message4.wav | d_message4.txt | NOT COMPANY EMPLOYEE | ANY |

METHOD TO UPDATE STATUS ON MULTIPLE VOICE AND TEXT SYSTEMS FROM A SINGLE DEVICE

BACKGROUND OF THE INVENTION

The present invention relates generally to a method for updating a message on a device and specifically to a method for simultaneously updating a plurality of messages on a plurality of devices using a single device.

Calendaring programs such as MICROSOFT OUTLOOK® and LOTUS NOTES® allow a user to organize their contact information, email, and calendar of events into a single interface. The calendaring program can be expanded to include other communication methods such as instant messaging and web interfaces. Thus, a user can use a calendaring program to coordinate all the different communication methods, such as business telephone, cellular telephone, fax, email, instant messaging (IM), and so forth.

One of the problems associated with calendaring programs is that the calendaring program is useful for organizing the contact information and calendaring of events, but not for connecting the devices or disseminating information through the devices. For example, a project manager may be associated with a plurality of devices, such as a business telephone, cellular telephone, email address, and IM address, which he uses to coordinate events with the project members. When the project manager is on vacation, out of the office, or otherwise unavailable, he needs to communicate his status to people who attempt to contact him through one of his devices. In order to do this, the project manager must change his voicemail message on his business telephone, change his voicemail on his cellular telephone, configure an automatic reply message on his email, and change his status on his IM channel. The process of updating the project manager's status on the plurality of devices is time consuming and cumbersome. The time consuming and cumbersome nature of the status update process causes many users to avoid updating the status of the devices, which decreases the ability of people to know when the user is available. The complexity and time consuming nature of the status update process would be significantly reduced if the user could update the status of all of the devices using a single device. Currently, no mechanism exists for updating the status of a plurality of devices using a single device. Therefore, a need exists for a method that allows a user to update his status on a plurality of devices using a single device.

Even when a user is not on vacation or out of the office, he may be unavailable for short periods of time. For example, the user may be in a meeting, on a telephone call with a client, or taking a short break. It is desirable to inform people attempting to contact the user that he is temporarily unavailable and inform the people attempting to contact the user when the user will be available. The user's calendaring program contains information regarding the times of the day that the user will be in meetings or will be attending scheduled events. It would be useful for a computer program to access the information in the calendaring program and inform people who are attempting to contact the user that the user is unavailable, the reason for the unavailability (i.e. in a meeting), and when the user will be available. Currently, no application exists that accesses a user's schedule in the calendaring program and disseminates information to people who are attempting to contact the user. Therefore, a need exists for a method for accessing a user's calendaring program and relaying the user's schedule and periods of availability to people who are attempting to contact the user.

SUMMARY OF THE INVENTION

The present invention, which meets the needs identified above, is a method for updating a message on a plurality of devices from a single device. The software embodiment of the present invention comprises a Configuration Program (CP), an Audio Device Update Program (ADUP), and a Text Device Update Program (TDUP). The CP allows the user to configure the options associated with the present invention. Using the CP, the user may enable and disable the present invention, add or delete devices, create and save messages, select existing messages to play to callers or display to senders, enable automated status updates, enable multiple message levels, or enable availability updates. The automated status update is a process by which the present invention interfaces with the user's calendaring program and automatically creates messages from the user's calendar. The multiple message levels are a hierarchy of messages in which the message sent to a caller or sender is determined by the caller or sender's identity. The availability update is a process by which the user's next available time is communicated to the caller or sender.

The ADUP responds to incoming calls on the user's audio devices. The ADUP determines whether automated status updates, multiple message levels, and availability updates are enabled. The ADUP selects the appropriate message to play based on these determinations. The TDUP responds to incoming data on the user's text devices using the same logic that the ADUP uses to respond to incoming calls on the user's audio devices. Callers and senders can also use the present invention to schedule redial or reconnect attempts based on the entries in the user's calendar. Because the present invention interfaces with the user's contacts in the calendaring program, the present invention may use a plurality of devices to send a message to a plurality of the user's contacts.

BRIEF DESCRIPTION OF DRAWINGS

The foregoing and other objects, features, and advantages of the invention will be apparent from the following more particular description of the preferred embodiment of the invention, as illustrated in the accompanying drawings wherein like reference numbers represent like parts of the invention, wherein.

DETAILED DESCRIPTION OF THE PREFERRED EMBODIMENT

Figure 1:
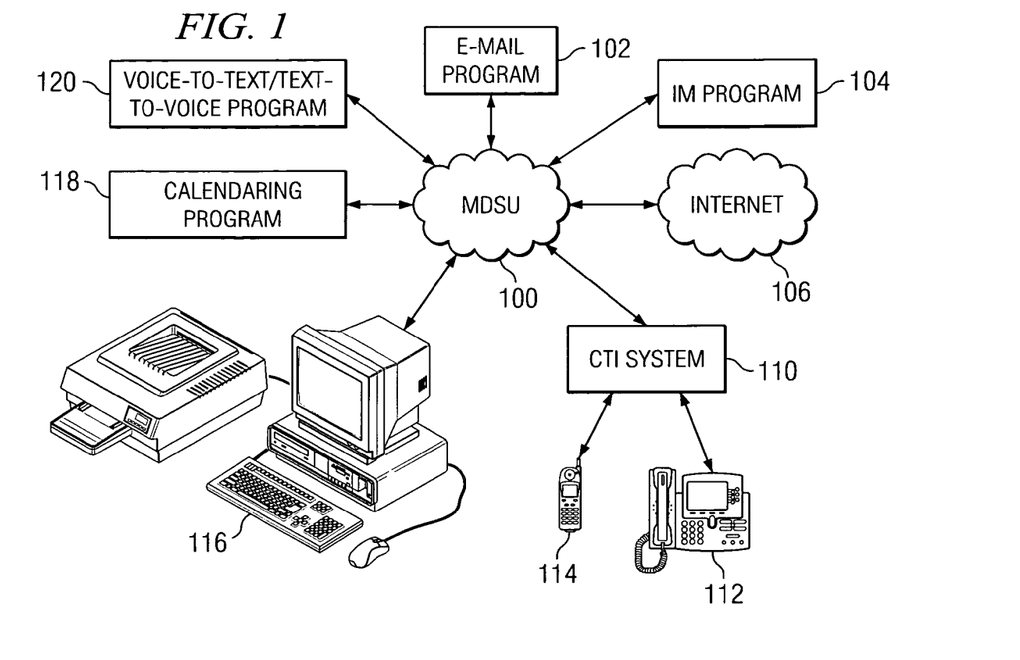
FIG. 1 is an illustration of the communication paths of the present invention.

FIG. 1 is an illustration of the communication paths of the present invention. Multiple Device Status Updater (MDSU) 100 is the software program of the present invention that communicates with the user's various devices. MDSU 100 communicates with the user's email program 102. MDSU 100 can send email using email program 102 and can configure auto-reply messages on email program 102. MDSU 100 also communicates with the user's IM program 104. MDSU 100 can send instant messages using IM program 104 and can configure the user's status on the IM channels accessible through IM program 104. MDSU 100 can communicate with users and other programs through webpages on Internet 106. MDSU 100 also communicates with Computer Telephony Interface (CTI) system 110. CTI system 110 allows computers to communicate with audio devices, such as telephone 112 and cellular telephone 114. MDSU 100 also communicates with the Internet (not shown) though the user's computer 116. If desired, the user can print information from MDSU 100 using the computer's printer. MDSU 100 also communicates with the user's calendaring program 118. MDSU 100 can access the user's schedule within calendaring program 118. MDSU 100 also communicates with voice-to-text/text-to-voice program 120. Voice-to-text/text-to-voice programs 120 convert audio files into text files and vice-versa. Voice-to-text/text-to-voice programs 120 are well known to persons of ordinary skill in the art, as evidenced by IBM's VIAVOICE®. The incorporation of voice-to-text and text-to-voice programs enables embodiments in which the computer program's voice/audio may be automatically used if a user's audio/voice file does not exist in the repository, or if the user does not want to use his or her own voice. In these embodiments, the user can set all devices that support voice/audio to the user's preferred voice choice, or the user can set each device to a different voice such as setting the office phone to the user's own voice and the cell phone to the computer's voice/audio.

Figure 2:
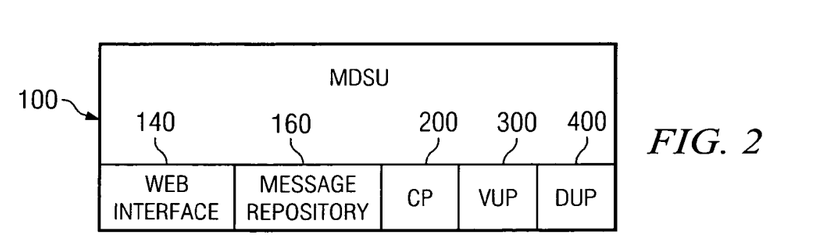
FIG. 2 is an illustration of the components of the Multiple Device Status Updater (MDSU) of the present invention.

FIG. 2 is an illustration of the components of the MDSU 100 of the present invention. MDSU 100 comprises web interface 140, message repository 160, Configuration Program (CP) 200, Audio Device Update Program (ADUP) 300, and Text Device Update Program (TDUP) 400. Web interface 140 is a webpage that allows the user to interact with the present invention. The user may also interact with the present invention through one of the devices illustrated in FIG. 1, such as cellular telephone 114. Message repository 160 is a database that contains messages created by the user or by the present invention. Message repository 160 may be local or it may be located on a centralized server so that it may be accessed anywhere. For example, message repository 160 may be tied into a pricing model such as e-business on demand or Application Service Provider. Configuration and message updates may be accomplished via a web application supporting the invention. Through the web, the user can access data and make updates at anytime and from any location where he or she can access the web. In such an embodiment, the user may dial-in from a telephone to manage his message. by performing such actions as add, delete, update, make a selection from an option list, re-record the current message, and/or update mapping. A roadmap menu may be presented if no visual display is available. Message repository is discussed further in conjunction with FIG. 3. Configuration Program (CP) 200 is a program that allows the user to configure the options associated with the present invention. Audio Device Update Program (ADUP) 300 is a program that updates the voicemails on the audio devices associated with the present invention. As used herein, the term "audio device" means a device that is normally accessed by speaking or other audio means. Examples of audio devices are telephones and cellular telephones. Text Device Update Program (TDUP) 400 is a program that updates the email replies and IM statuses on the text devices associated with the present invention. As used herein, the term "text device" means a device that is normally accessed by written or other text means. Examples of audio devices are email, instant messaging (IM), and text messaging on a cellular telephone or personal digital assistant (PDA). As used herein, the term "device" encompasses both audio devices and text devices.

Figure 3:
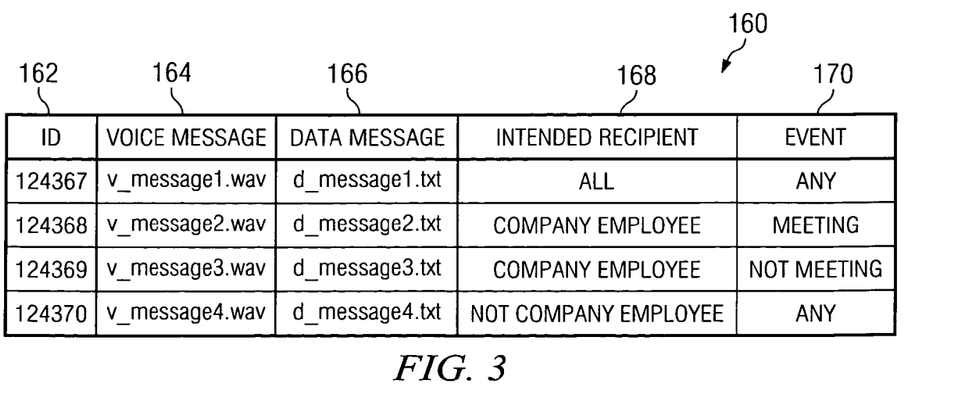
FIG. 3 is an illustration of the messages stored in the message repository of the present invention.

FIG. 3 is an illustration of the messages stored in message repository 160 of the present invention. In FIG. 3, each message is a row in message repository 160. Each message is stored in a common format, such as XML, so that they may be used with a plurality of devices. The messages may optionally be ranked by preference. Each message has an ID 162, an associated voice message 164, an associated data message 166, intended recipients 168, and an event 170. The term "data message" is used in lieu of the term "text message" because text message typically refers to messages sent over a cellular telephone. The term "data message" is broader than the term "text message." A data message may include a text message. ID 162 is a unique identifier that distinguishes each message from the other messages. Voice message 164 is an audio file that is the message played on the voicemail on the audio devices. Data message 166 is a data file that contains a written message that corresponds to voice message 164. Voice-to-text/text-to-voice program 120 can be used to convert voice message 164 into data message 166 and vice-versa. Intended recipient 168 is a limiting field that defines who can hear or receive the message. The intended recipient data may come from a company directory using the X.509 directory standard, such as the IBM Bluepages. Likewise, event 170 is a limiting field that defines the events in calendaring program 118 that are associated with the message. In an alternate embodiment, a Lightweight Directory Access Protocol (LDAP) directory may be integrated with the intended recipient data to define not only who may hear or receive the message, but also to alter the message based on the recipient's privileges according to the directory. In a further alternate embodiment, the user can define one or more messages with back up information for a given device and forward the message to a back up person. The caller/sender can then be prompted to determine whether he or she wants to hear/see the back up information.

Figure 4:
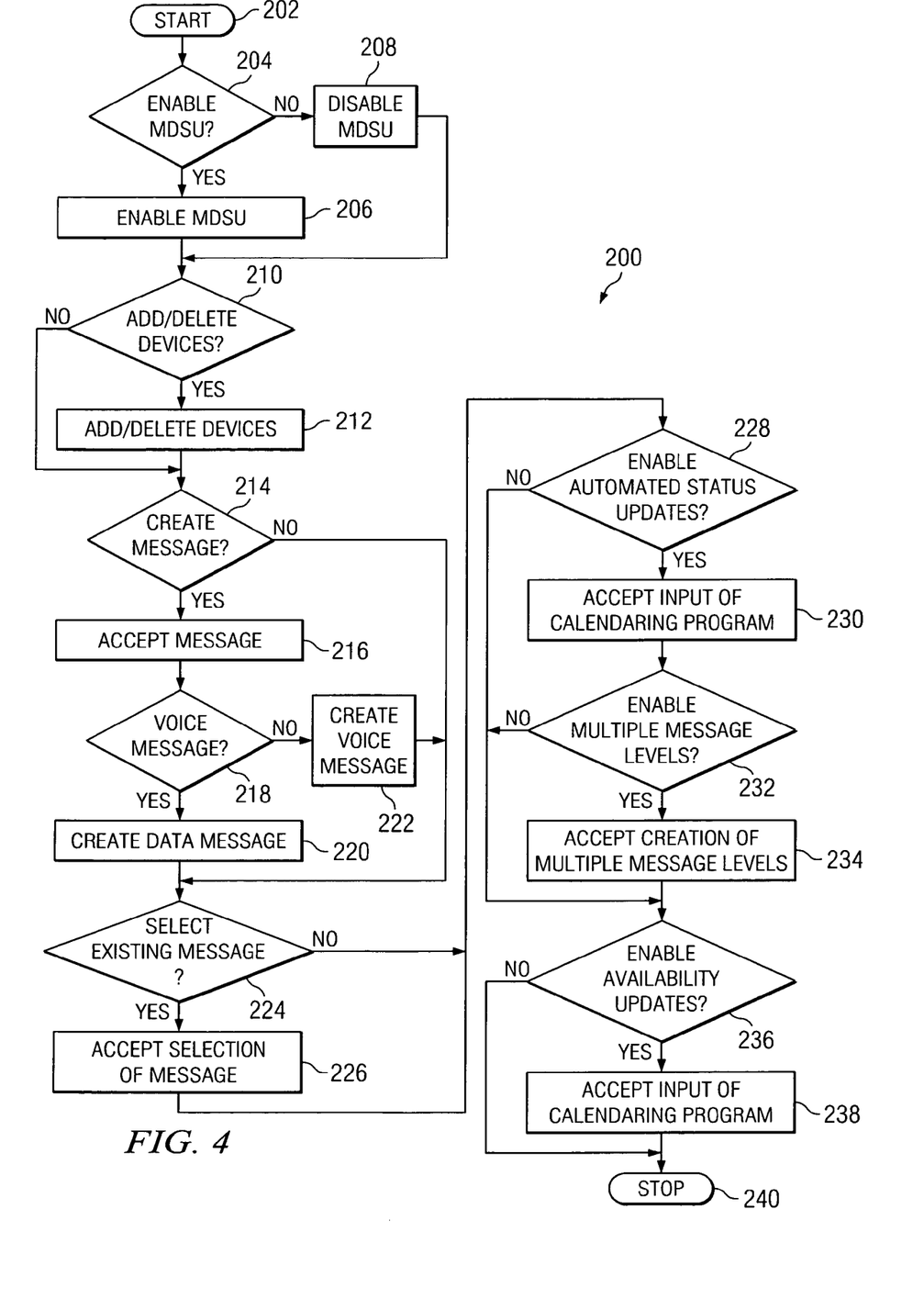
FIG. 4 is an illustration of the logic of the Configuration Program (CP) of the present invention.

FIG. 4 is an illustration of the logic of Configuration Program (CP) 200 of the present invention. CP 200 is a computer program that allows the user to configure the options associated with the present invention. As used herein, the term "user" means the person who is associated with the audio and text devices. As used herein, the term "caller" means the individual who is attempting to contact the user on an audio device. As used herein, the term "sender" means the individual who is attempting to contact the user on a text device. Thus, for the purposes herein, a caller attempts to contact the user on one of the user's audio devices and a sender attempts to contact the user on one of the user's text device. The user may access CP 200 through a web interface or through a voice menu on a telephone. Persons of ordinary skill in the art are aware of other means by which the user can access CP 200.

CP 200 starts (202) when invoked by the user. CP 200 can be secured using a username/password combination to ensure that only the user can change the configuration options associated with CP 200. CP 200 first determines whether the user wants to enable MDSU 100 (204). Enabling MDSU 100 means that the present invention updates the messages on a plurality of devices associated with the present invention. This feature may be turned off by disabling MDSU 100. If the user wants to enable MDSU 100, then MDSU 100 is enabled (206) and CP 200 proceeds to step 210. If the user does not want to enable MDSU 100, then MDSU 100 is disabled (208) and CP 200 proceeds to step 210. In an alternate embodiment, CP 200 may be configured to automatically enable itself based upon a set of user defined rules. For example, CP 200 may automatically enable itself after the screen saver is displayed, after thirty minutes have elapsed, or after there has been no keyboard input for five minutes. An automatic enablement configuration is useful when the user has disabled CP 200 but has moved away from his or her computer in order to attend a meeting or for some other purpose.

At step 210, CP 200 determines whether the user wants to add or delete any devices (210). The user may want to associate additional devices with the present invention when he obtains a new device. The user may also want to remove a device from association with the present invention when he removes a device from service. If the user does not want to add or delete any devices, then CP 200 proceeds to step 214. If the user wants to add or delete a device, then CP 200 accepts a user input of a device to be added or deleted (212) For the purposes herein, all of the devices added but not deleted in step 212 are devices associated with the present invention. CP 200 then proceeds to step 214.

At step 214, CP 200 determines whether the user wants to create a message (214). The user may create a message to update his status on the devices. The message may be either a voice message or a data message. If the user does not want to create a message, then CP 200 proceeds to step 224. If the user wants to create a message, then CP 200 accepts input of a message from the user and stores the message in message repository 160 (216). CP 200 then determines whether the message is a voice message (218). If the message is a voice message, then CP 200 creates a data message from the voice message using voice-to-text/text-to-voice program 120 (220), and proceeds to step 224. If the message is not a voice message, then CP 200 creates a voice message from the data message using voice-to-text/text-to-voice program 120 (222), and proceeds to step 224.

At step 224, CP 200 determines whether the user wants to select an existing message from message repository 160 (224). The user would want to select an existing message when he has stored a message in message repository 160 and wants to use the message on his devices associated with the present invention. If the user does not want to select an existing message, then CP 200 proceeds to step 228. If the user wants to select an existing message, then CP 200 accepts a user selection of a message (226), and proceeds to step 228.

At step 228, CP 200 determines whether the user wants to enable the automated status updates (228). As used herein, the term "automatic status updates" means a process in which the present invention obtains messages to be sent to a caller/sender. The messages obtained by the present invention may be derived by interfacing with calendaring program 118, to automatically create messages from the user's calendar. In addition, a user message may be obtained from a user selected or created message without interaction with calendaring program 118. The user message may be selected by the user from a number of messages in memory, or the user may create a new message and input the new message into the memory for access by CP 200. For example, a user may have a need to change a selected message but not have access to the user's computer. The user could access CP 200 with a Personal Digitial Assistant (PDA) and enter the revised message. In other words, the present invention determines the current event that the user is participating in, creates a message indicating which event the user is participating in, and sends the message to the person attempting to contact the user. If the user does not want to enable automatic status updates, then CP 200 proceeds to step 236. If the user wants to create automatic status updates, then CP 200 allows the user to specify his calendaring program (230). Typically, the user will specify the location and specific type (i.e. OUTLOOK® or LOTUS NOTES®) of calendaring program. CP 200 then proceeds to step 232.

At step 232, CP 200 then determines whether the user wants to enable multiple message levels (232). As used herein, the term "multiple message levels" shall mean a hierarchy of messages in which the message sent to a caller or sender is determined by the person's identity. Persons of ordinary skill in the art will appreciate that multiple message levels can configured to accept determining criteria other than the person's identity, such as the current event in calendaring program 118. If the user does not want to enable multiple message levels, then CP 200 proceeds to step 236. If the user wants to enable multiple message levels, then CP 200 accepts a user creation of the multiple message levels (234). In creating the multiple message levels, the user specifies an intended recipient for a specific message. Examples of messages configured for multiple message levels are the second, third, and forth messages in FIG. 3. CP 200 then proceeds to step 236.

At step 236, CP 200 determines whether the user wants to enable availability updates (236). As used herein, the term "availability updates" means a process by which the user's next available time is communicated to the caller or sender. In other words, when the user is unavailable, the present invention looks at the user's schedule in calendaring program 118, determines the next time that the user will be available, and communicates the next available time to the caller or sender. If the user does not want to enable availability updates, then CP 200 ends (240). If the user wants to enable availability updates, then CP 200 accepts a user input of the calendaring program (238). As with step 230, the user specifies the calendaring program by location and type. If desired, the user may also limit who may receive the availability updates using the multiple message levels. CP 200 then ends (240).

Figure 5:
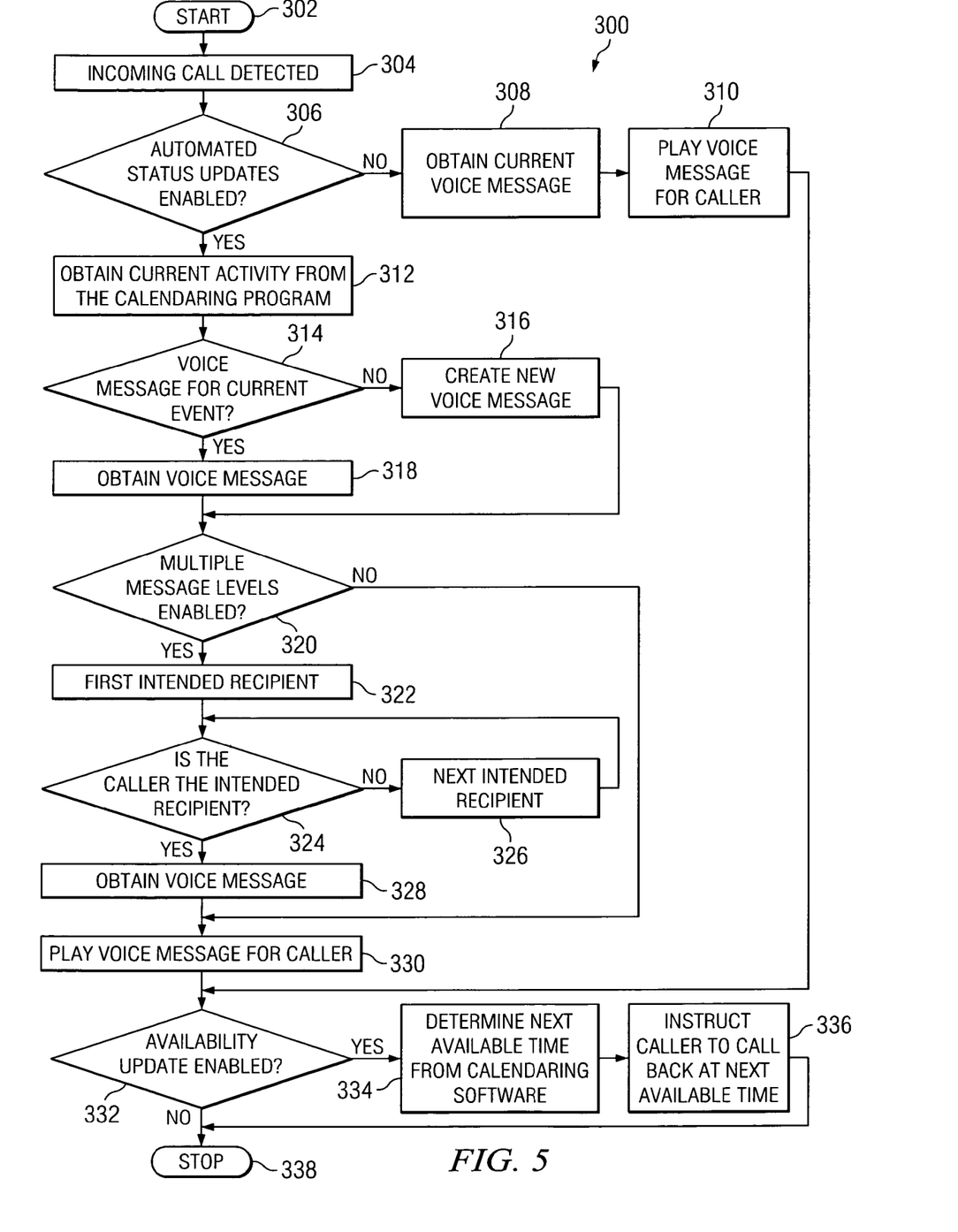
FIG. 5 is an illustration of the logic of the Audio Device Update Program (ADUP) of the present invention.

FIG. 5 is an illustration of the logic of Audio Device Update Program (ADUP) 300 of the present invention. ADUP 300 is a computer program that detects incoming calls on audio devices and plays the appropriate message for the caller. As used herein, the term "call" means a communication on an audio device from the caller to the user. ADUP 300 starts (302) whenever MDSU 100 is enabled by the user in step 206 of CP 200. ADUP 300 then detects an incoming call (304). ADUP 300 determines if the user has enabled automated status updates (306). If the user has not enabled automated status updates, then ADUP 300 obtains the current voice message that the user has selected (308). The user selected the current voice message in step 226 of CP 200. ADUP 300 then plays the current voice message for the caller (310) and proceeds to step 332.

Returning to step 306, if the user has enabled automatic status updates, then ADUP 300 obtains the current event from calendaring program 118 (312). ADUP 300 then determines whether a voice message exists for the current event (314). In other words, ADUP 300 reviews the messages in message repository 160 and determines if any of the events 170 match the current event. If a message exists for the current event, then ADUP 300 obtains the voice message associated with that message (318) and proceeds to step 320. Returning to step 314, if no voice message exists for the current event, then ADUP 300 creates a new voice message and stores the new voice message in message repository 160 (316). ADUP 300 then proceeds to step 320.

At step 320, ADUP 300 determines whether the user has enabled multiple message levels (320). If the user has not enabled multiple message levels, then ADUP 300 plays the current voice message for the caller (330), and proceeds to step 332. Returning to step 320, if the user has enabled multiple message levels, then ADUP 300 looks at the first intended recipient 168 in message repository 160 (322). ADUP 300 then determines whether the caller is the intended recipient 168 (324). If the caller is not the intended recipient, then ADUP 300 proceeds to the next intended recipient 168 in message repository 160 (326) and returns to step 324. Returning to step 324, if the caller is the intended recipient, then ADUP 300 obtains the voice message associated with the caller (328). ADUP 300 then plays the voice message for the caller (330), and proceeds to step 332.

At step 332, ADUP 300 determines whether the user has enabled availability updates (332). If the user has not enabled availability updates, then ADUP 300 ends (338). Returning to step 332, if the user has enabled availability updates, then ADUP 300 determines the user's next available time from calendaring program 118 (334). ADUP 300 then instructs the caller to call back at the user's next available time (336). If desired, ADUP 300 can optionally instruct the caller's audio device to automatically redial the user at the user's next available time. Alternatively, ADUP 300 can optionally instruct the user's audio device to automatically call the caller at the user's next available time. Either of these options may require a queuing and/or prioritization algorithm known to persons of ordinary skill in the art. ADUP 300 then ends (338).

Figure 6:
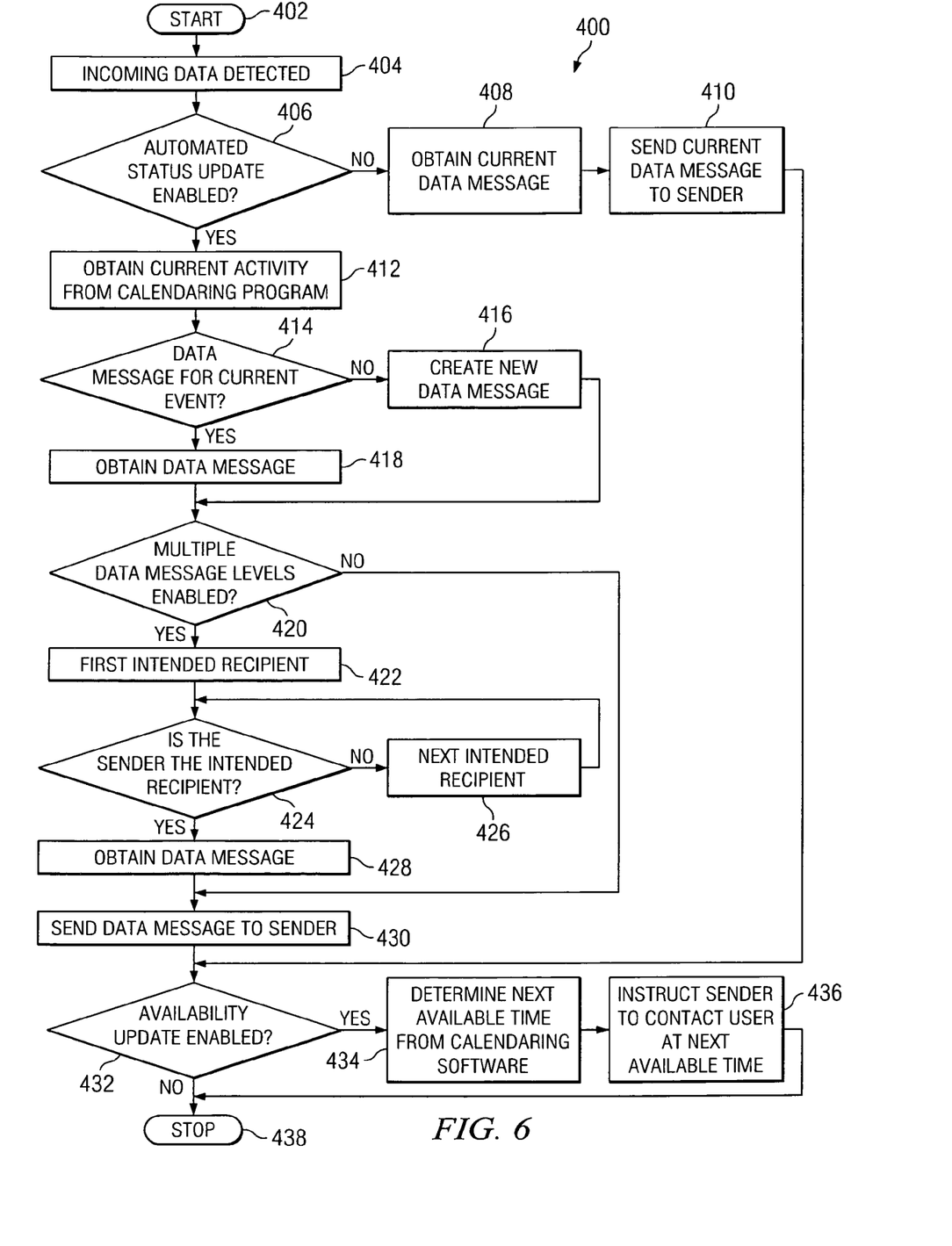
FIG. 6 is an illustration of the logic of the Text Device Update Program (TDUP) of the present invention.

FIG. 6 is an illustration of the logic of Text Device Update Program (TDUP) 400 of the present invention. TDUP 400 is a computer program that detects incoming data on text devices and sends the appropriate message to the sender. As used herein, the term "data" means a communication on a text device from the sender to the user. TDUP 400 starts (402) whenever MDSU 100 is enabled by the user in step 206 of CP 200. TDUP 400 then detects incoming data (404). TDUP 400 determines if the user has enabled automated status updates (406). If the user has not enabled automated status updates, then TDUP 400 obtains the current data message that the user has selected (408). The user selected the current data message in step 226 of CP 200. TDUP 400 then sends the current data message to the sender (410) and proceeds to step 432.

Returning to step 406, if the user has enabled automatic status updates, then TDUP 400 obtains the current event from calendaring program 118 (412). TDUP 400 then determines whether a data message exists for the current event (414). In other words, TDUP 400 reviews the messages in message repository 160 and determines if any of the events 170 match the current event. If a message exists for the current event, then TDUP 400 obtains the data message associated with that message (418) and proceeds to step 420. Returning to step 414, if no data message exists for the current event, then TDUP 400 creates a new data message and stores the new data message in message repository 160 (416). TDUP 400 then proceeds to step 420.

At step 420, TDUP 400 determines whether the user has enabled multiple message levels (420). If the user has not enabled multiple message levels, then TDUP 400 sends the current data message to the sender (430), and proceeds to step 432. Returning to step 420, if the user has enabled multiple message levels, then TDUP 400 looks at the first intended recipient 168 in message repository 160 (422). TDUP 400 then determines whether the sender is the intended recipient 168 (424). If the sender is not the intended recipient, then TDUP 400 proceeds to the next intended recipient 168 in message repository 160 (426) and returns to step 424. Returning to step 424, if the sender is the intended recipient, then TDUP 400 obtains the data message associated with the sender (428). TDUP 400 then sends the data message to the sender (430), and proceeds to step 432.

At step 432, TDUP 400 determines whether the user has enabled availability updates (432). If the user has not enabled availability updates, then TDUP 400 ends (438). Returning to step 432, if the user has enabled availability updates, then TDUP 400 determines the user's next available time from calendaring program 118 (434). TDUP 400 then instructs the sender to contact the user at the user's next available time (436). If desired, TDUP 400 can optionally instruct the sender's text device to automatically contact the user at the user's next available time. Alternatively, TDUP 400 can optionally instruct the user's text device to automatically contact the sender at the user's next available time. Either of these options may require a queuing and/or prioritization algorithm known to persons of ordinary skill in the art. TDUP 400 then ends (438).

Although the preferred embodiment of the present invention routes incoming calls and data to the present invention for centralized processing, persons of ordinary skill in the art will appreciate that the present invention may be configured such that the present invention merely changes the voicemail, autoreplay, and status of the devices to a single message. While this embodiment reduces the functionality of the present invention, it is preferable when the user wants a simplified embodiment of the invention. Thus, using the current embodiment, the user can create a simple message such as "I am unavailable until June $6^{th}$, please contact my secretary at 214-555-2412 if you need assistance" on a single device. The simple message would then be recorded on all of the voicemails for the user's audio devices, and the user's text devices would be configured to send an auto-reply data message that corresponds to the simple message anytime the user receives data, such as an email or instant message.

Persons of ordinary skill in the art will also appreciate that the present invention may be configured to send a similar message to a plurality of people using a plurality of different devices. For example, a project manager may want to contact all of the project members in his group to inform them of an immediate and urgent deadline. He would first create a message with the information he wants to convey. Because commercial calendaring programs also include contact information such as multiple telephone numbers, fax numbers, email addresses, and IM addresses, he would then identify the people he wants to contact in his calendaring program. The present invention would then be used to send the same message out to all of the people whom the project manager identified.

In an alternate embodiment of the invention, a caller/sender who has received a reply message stating that the recipient is not available but will be available at a time shown in the reply message, may elect to be reminded to call back at the next available time shown in the reply message. Using a separate queuing and prioritization system within the knowledge of persons skilled in the art, the invention may be configured to allow a user to select an auto-redial function so that at the next available time shown in the reply message, the caller/sender's device will automatically re-dial. Using message/device mapping within the knowledge of a person skilled in the art, the auto redial function may also be configured to automatically send messages regarding deadlines in a project.

A person of skill in the art will appreciate that various modifications and changes may be made in the preferred embodiment of the present invention without departing from its true spirit. The preceding description is for illustrative purposes only and should not be construed in a limiting sense.

The scope of the invention should be limited only by the language of the following claims.

Furthermore, the illustrative embodiments can take the form of a computer program product stored on a computer readable storage medium.

In illustrative embodiments, the computer program product comprises a set of instructions stored on the computer readable storage medium, the set of instructions directing a processor to perform steps comprising detecting an incoming call from a caller or a data from a sender intended to be received by a user, determining whether the user has enabled automated status updates, obtaining a current message and playing the current message for the caller or sending the current message to the sender responsive to the determination that the automated status updates are not enabled.

Responsive to the determination that the automated status updates are enabled, the set of instructions further directs the processor to perform steps comprising obtaining a current event from a calendaring program of the user, determining whether a user created message exists for the current event, obtaining the user created message responsive to the determination that the user created message exists for the current event, and creating a new message responsive to the determination that the user created message does not exist for the current event. The new message may be created by the calendaring program of the user and the new message may be associated with the current event.

In illustrative embodiments, the set of instruction further directs the processor (apparatus) to perform steps comprising determining whether multiple message levels are enabled, obtaining a recipient intended message associated with the caller or sender responsive to the determination that the multiple message levels are enabled, and playing for the caller or sending to the sender at least one of the user created message, the new message, or the recipient intended message. The caller or the sender is updated on a status of the user. The recipient intended message is one of a plurality of recipient intended messages stored in a message repository in a format adapted for use with a plurality of devices. Each recipient intended message has an identification, an associated voice message, an associated data message, one or more intended recipients, and an event. The one or more intended recipients is a limiting field that defines callers and senders permitted to hear or receive the message. The associated voice message is an audio file that is played on a voicemail on an audio device. The associated data message is a data file that contains a written message corresponding to the associated voice message. The event is a limiting field that defines one or more events in the calendaring program.

What is claimed is:

1. a computer implemented method comprising:
   a. detecting an incoming call from a caller or a data from a sender intended to be received by a user;
   b. determining whether the user has enabled automated status updates;
   c. responsive to the determination that the automated status updates are not enabled, obtaining a current message, and playing the current message for the caller or sending the current message to the sender; and
   d. responsive to the determination that the automated status updates are enabled, performing second steps comprising:
      da. obtaining a current event from a calendaring program of the user;
      db. determining whether a user created message exists for the current event;
      dc. responsive to the determination that the user created message exists for the current event, obtaining the user created message;
      dd. responsive to the determination that the user created message does not exist for the current event, creating a new message wherein the new message is created by the calendaring program of the user and wherein the new message is associated with the current event;
      de. determining whether multiple message levels are enabled;
      df. responsive to the determination that the multiple message levels are enabled, obtaining a recipient intended message associated with the caller or sender; and
      dg. playing for the caller or sending to the sender at least one of the user created message, the new message, or the recipient intended message, wherein the caller or the sender is updated on a status of the user;
      dh. wherein the recipient intended message is one of a plurality of recipient intended messages stored in a message repository in a format adapted for use with a plurality of devices;
      di. wherein each recipient intended message has an identification, an associated voice message, an associated data message, one or more intended recipients, and an event;
      dj. wherein the one or more intended recipients is a limiting field that defines callers and senders permitted to hear or receive the message;
      dk. wherein the associated voice message is an audio file that is played on a voicemail on an audio device;
      dl. wherein the associated data message is a data file that contains a written message corresponding to the associated voice message; and
      dm. wherein the event is a limiting field that defines one or more events in the calendaring program.

2. A computer program product stored on a computer readable storage medium, the computer program product comprising a set of instructions stored on the computer readable storage medium, the set of instructions directing a processor to perform steps comprising:
   a. detecting an incoming call from a caller of a data from a sender intended to be received by a user;
   b. determining whether the user has enabled automated status updates;
   c. responsive to the determination that the automated status updates are not enabled, obtaining a current message, and playing the current message for the caller or sending the current message to the sender; and
   d. responsive to the determination that the automated status updates are enabled, performing steps comprising:
      da. obtaining a current event from a calendaring program of the user;
      db. determining whether a user created message exists for the current event;
      dc. responsive to the determination that the user created message exists for the current event, obtaining the user created message;
      dd. responsive to the determination that the user created message does not exist for the current event, creating a new message wherein the new message is created by the calendaring program of the user and wherein the new message is associated with the current event;
      de. determining whether multiple message levels are enabled;

df. responsive to the determination that the multiple message levels are enabled, obtaining a recipient intended message associated with the caller or sender; and dg. playing for the caller or sending to the sender at least one of the user created message, the new message, or the recipient intended message, wherein the caller or the sender is updated on a status of the user;

dh. wherein the recipient intended message is one of a plurality of recipient intended messages stored in a message reository in a format adapted for use with a plurality of devices;

di. wherein each recipient intended message has an identification, an associated voice message, an associated data message, one or more intended recipients, and an event;

dj. wherein the one or more intended recipients is a limiting field that defines callers and senders permitted to hear or receive the message;

dk. wherein the associated voice message is an audio file that is played on a voicemail on an audio device;

dl. wherein the associated data message is a data file that contains a written message corresponding to the associated voice message; and dm. wherein the event is a limiting field that defines one or more events in the calendaring program.

3. An apparatus (a processor) comprising a set of instructions stored on a computer readable storage medium, the set of instructions comprising:

a. means for detecting an incoming call from a caller of a data from a sender intended to be received by a user;

b. means for determining whether the user has enabled automated status updates;

c. means for obtaining a current message responsive to the determination that the automated status updates are not enabled, and means for playing the current message for the caller or sending the current message to the sender; and d. means for performing steps responsive to the determination that the automated status updates are enabled, the steps comprising:

da. means for obtaining a current event from a calendaring program of the user;

db. means for determining whether a user created message exists for the current event;

dc. means for obtaining the user created message responsive to the determination that the user created message exists for the current event;

dd. means for creating a new message responsive to the determination that the user created message does not exist for the current event, wherein the new message is created by the calendaring program of the user and wherein the new message is associated with the current event;

de. means for determining whether multiple message levels are enabled;

df. means for obtaining a recipient intended message associated with the caller or sender responsive to the determination that the multiple message levels are enabled; and dg. means for playing for the caller or sending to the sender at least one of the user created message, the new message, or the recipient intended message, wherein the caller or the sender is updated on a status of the user;

dh. wherein the recipient intended message is one of a plurality of recipient intended messages stored in a message repository in a format adapted for use with a plurality of devices;

di. wherein each recipient intended message has an identification, an associated voice message, an associated data message, one or more intended recipients, and an event;

dj. wherein the one or more intended recipients is a limiting field that defines callers and senders permitted to hear or receive the message;

dk. wherein the associated voice message is an audio file that is played on a voicemail on an audio device;

dl. wherein the associated data message is a data file that contains a written message corresponding to the associated voice message; and dm. wherein the event is a limiting field that defines one or more events in the calendaring program.

* * * * *

UNITED STATES PATENT AND TRADEMARK OFFICE
CERTIFICATE OF CORRECTION

PATENT NO. : 7,631,042 B2 Page 1 of 1
APPLICATION NO. : 10/880728
DATED : December 8, 2009
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1295 days.

Signed and Sealed this

Second Day of November, 2010

David J. Kappos
*Director of the United States Patent and Trademark Office*